United States Patent
Ewing et al.

[19]

[11] Patent Number: 5,951,100
[45] Date of Patent: Sep. 14, 1999

[54] SUNROOF ASSEMBLY FOR AN AUTOMOTIVE VEHICLE

[75] Inventors: Kip A. Ewing, Dearborn; John D. Goins, Redford; Mark A. Caye, Allen Park; David A. Smith, Macomb Township, all of Mich.

[73] Assignee: ASC Incorporated, Southgate, Mich.

[21] Appl. No.: 08/779,925

[22] Filed: Jan. 6, 1997

Related U.S. Application Data

[63] Continuation of application No. PCT/US94/07716, Jul. 5, 1994.

[51] Int. Cl.$^6$ ...................................................... B60J 7/00
[52] U.S. Cl. .................... 296/214; 296/216.03; 296/221; 296/223
[58] Field of Search ............................... 296/214, 220.01, 296/223, 221, 222, 216.03; 49/63, 127, 128, 130

[56] References Cited

U.S. PATENT DOCUMENTS

| | | | |
|---|---|---|---|
| 1,563,287 | 11/1925 | Pape | 49/127 |
| 3,955,848 | 5/1976 | Lutz et al. . | |
| 4,185,868 | 1/1980 | Kaltz et al. . | |
| 4,420,184 | 12/1983 | Kaltz | 296/221 |
| 4,556,835 | 12/1985 | Vogel et al. . | |
| 4,566,730 | 1/1986 | Knabe et al. | 296/221 |
| 4,601,091 | 7/1986 | Grimm et al. . | |
| 4,601,512 | 7/1986 | Boots | 290/221 |
| 4,619,480 | 10/1986 | Motoyama et al. | 296/217 |
| 4,626,023 | 12/1986 | Lutz . | |

(List continued on next page.)

FOREIGN PATENT DOCUMENTS

| | | | |
|---|---|---|---|
| 0290106 | 11/1988 | European Pat. Off. . | |
| 1257321 | 2/1969 | France | 296/222 |
| 1946161 | 3/1971 | Germany . | |
| 2234852 | 1/1974 | Germany . | |
| 2318391 | 10/1974 | Germany . | |
| 1946161 B2 | 1/1978 | Germany . | |
| 3603314 | 8/1987 | Germany . | |
| 3802379A1 | 8/1988 | Germany . | |
| 3822258A1 | 3/1989 | Germany . | |
| 3813049 | 11/1989 | Germany | 296/222 |
| 3840119 | 5/1990 | Germany | 296/224 |
| 3900361 | 7/1990 | Germany | 296/221 |
| 4124505A1 | 10/1992 | Germany . | |
| 58-218423 | 12/1958 | Japan . | |
| 3197232 | 8/1991 | Japan . | |

(List continued on next page.)

OTHER PUBLICATIONS

"Ford 1973 Car Shop Manual", vol. 4 Body, Ford Marketing Corporation, pp. 46–10–01 through 46–10–8, 46–11–01 through 46–11–07.

A.K. Legg, SAAB Owners Workshop Manual, 1981, 1986, pp. 240 and 241.

ASC drawing No. C–49X5–0001–AXXX entitled "Housing Assembly–Complete" (Mar. 24, 1995).

*Primary Examiner*—Dennis H. Pedder
*Attorney, Agent, or Firm*—Harness, Dickey & Pierce, P.L.C.

[57] ABSTRACT

A sunroof assembly (20) of an automotive vehicle employs dual sunroof panes, a pair of movable sunshades and a control system for operating the function thereof. In one aspect of the present invention, a sunroof assembly provides a substantially transparent front pane (22) which is slidable from a covering position to a retracted position and a substantially transparent rear pane (24) movable from a covering position to an open position. In another aspect of the present invention, a sunroof assembly (20) provides a pair of substantially transparent panes in combination with a front sunshade (26) and a rear sunshade (28). The sunshades are movable from a functional position to a stowed position. In a further aspect of the present invention, a control system (32) provides an electric switch assembly (30), electrical circuit and software for operating the panes and sunshades.

35 Claims, 9 Drawing Sheets

U.S. PATENT DOCUMENTS

| | | | |
|---|---|---|---|
| 4,630,860 | 12/1986 | Fuerst et al. | 296/217 |
| 4,643,478 | 2/1987 | Boots | 296/221 |
| 4,647,106 | 3/1987 | Furst | 296/223 |
| 4,664,439 | 5/1987 | Schaetzler et al. | 296/213 |
| 4,671,564 | 6/1987 | Sumida et al. | 296/214 |
| 4,679,846 | 7/1987 | Lux et al. | 296/214 |
| 4,684,169 | 8/1987 | Igel et al. | 296/221 |
| 4,699,421 | 10/1987 | Schaetzler et al. | 296/221 |
| 4,709,959 | 12/1987 | Paerisch et al. | 296/217 |
| 4,746,165 | 5/1988 | Fuerst et al. | 296/223 X |
| 4,749,227 | 6/1988 | Bienert et al. | 296/221 |
| 4,811,985 | 3/1989 | Kruger et al. | 296/214 |
| 4,835,449 | 5/1989 | Huehn . | |
| 4,869,548 | 9/1989 | Nagata et al. | 296/221 |
| 4,883,311 | 11/1989 | Kohlpaintner et al. | 296/213 |
| 4,910,445 | 3/1990 | Borrmann . | |
| 4,911,496 | 3/1990 | Fuerst . | |
| 4,923,246 | 5/1990 | Takahashi et al. | 296/221 |
| 4,941,706 | 7/1990 | Jardin | 296/213 |
| 4,946,225 | 8/1990 | Jardin | 296/213 |
| 4,978,165 | 12/1990 | Schreiter et al. . | |
| 4,982,995 | 1/1991 | Takahashi | 296/221 |
| 4,995,665 | 2/1991 | Ichinose et al. | 296/213 |
| 5,018,783 | 5/1991 | Chamings et al. | 296/219 |
| 5,026,113 | 6/1991 | DiCarlo et al. | 296/221 |
| 5,029,937 | 7/1991 | Yamamoto | 296/223 |
| 5,044,222 | 9/1991 | Tanaka et al. . | |
| 5,069,500 | 12/1991 | Reihl et al. | 296/214 |
| 5,085,622 | 2/1992 | Kohlpaintner et al. | 296/222 |
| 5,090,767 | 2/1992 | Schreiter et al. . | |
| 5,104,178 | 4/1992 | Bienert . | |
| 5,141,283 | 8/1992 | Omoto et al. | 296/219 |
| 5,154,482 | 10/1992 | Hayashi et al. | 296/223 |
| 5,184,870 | 2/1993 | Bauhof | 296/223 |
| 5,197,779 | 3/1993 | Mizuno et al. | 296/220.01 |
| 5,248,278 | 9/1993 | Fuerst et al. | 454/129 |
| 5,250,882 | 10/1993 | Odoi et al. . | |
| 5,261,722 | 11/1993 | Stalgy et al. | 296/220.01 X |
| 5,288,125 | 2/1994 | Huyer . | |
| 5,405,185 | 4/1995 | Cheron et al. | 296/223 |
| 5,447,355 | 9/1995 | Kelm | 296/223 |
| 5,516,187 | 5/1996 | Zani et al. | 296/223 |

FOREIGN PATENT DOCUMENTS

| | | | |
|---|---|---|---|
| 524437 | 2/1993 | Japan . | |
| 406156085 | 6/1994 | Japan | 296/222 |
| 2047636 | 12/1980 | United Kingdom | 296/222 |
| 2077461 | 12/1981 | United Kingdom | 296/221 |
| 2295801 | 6/1996 | United Kingdom . | |
| WO 94/25301 | 11/1994 | WIPO . | |

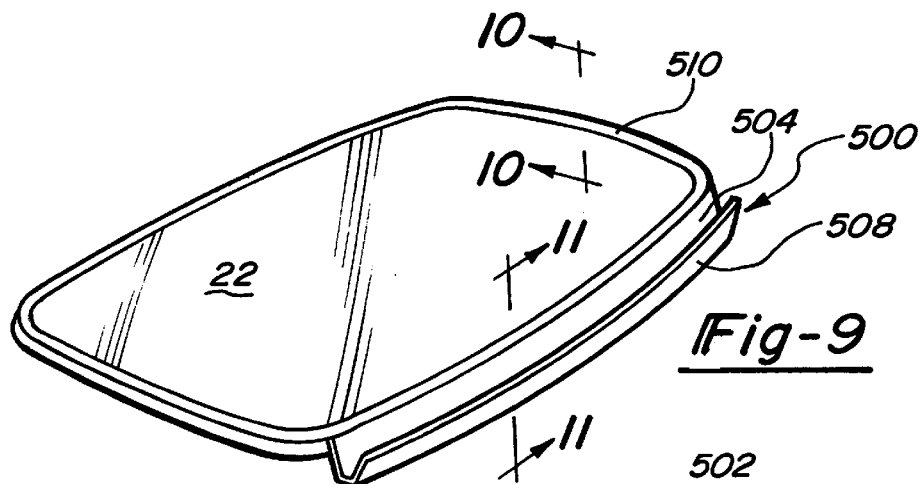
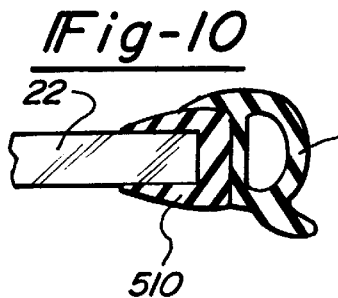
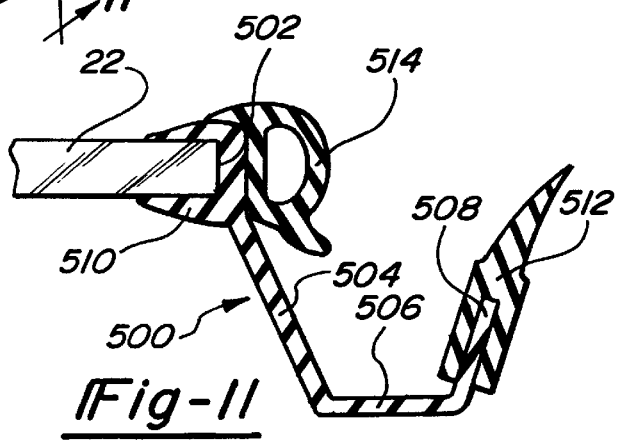
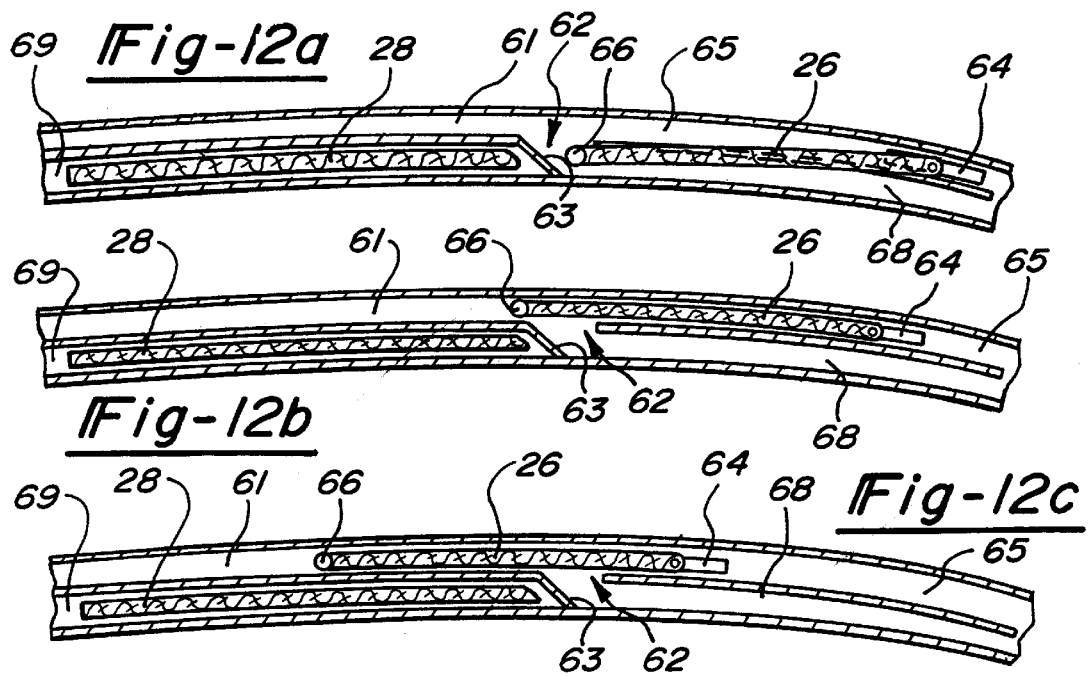

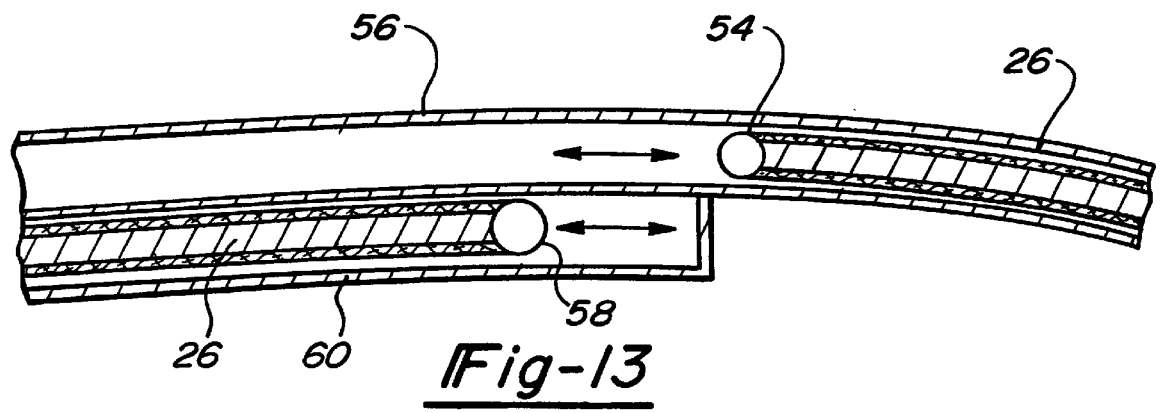
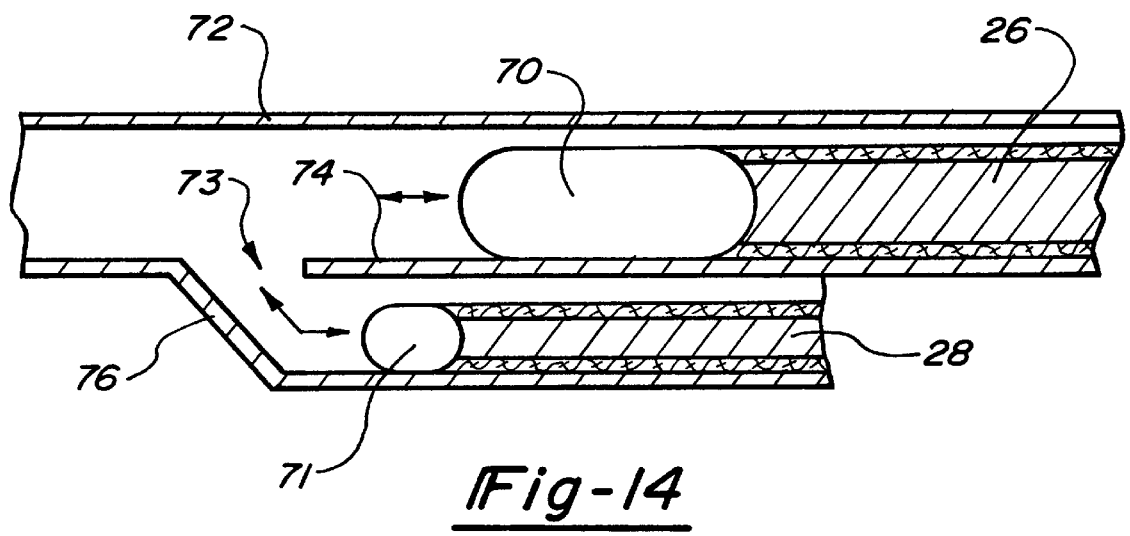

SUNROOF ASSEMBLY FOR AN AUTOMOTIVE VEHICLE

This is a continuation of U.S. patent application Ser. No. PCT/US94/07716, filed Jul. 5, 1994, which designated the United States now abandoned.

BACKGROUND AND SUMMARY OF THE INVENTION

This invention relates generally to sunroof assemblies for automotive vehicles and specifically to a dual sunroof assembly and a control system for operating same.

It is common knowledge to provide a single sunroof within a stationary roof of an automotive vehicle. These traditional sunroofs typically employ a transparent glass pane slidable from a covering position, somewhat flush to the roof, to a retracted position, which allows sunlight and ventilation access through an opening within the roof. Another traditional sunroof construction provides a transparent glass pane which is tiltable from a closed position to a pivoted venting position. This allows air from within the vehicle to pass through an opening created between the vented pane and the roof. A single sliding interior sunshade has also been employed with various of these sunroofs. Such sunshades are typically horizontally oriented and slidably movable to expose or cover a sunroof.

It is also known by those in the automotive industry to provide a pivotable wind deflector in front of a sliding spoiler-type sunroof. Such a construction is disclosed within U.S. Pat. No. 4,659,140 entitled "Vehicle Roof" which issued to Fuerst et al. on Apr. 21, 1987, and U.S. Pat. No. 5,069,501 entitled "Spoiler Control Mechanism" which issued to Baldwin et al. on Dec. 3, 1991, the disclosures of which are incorporated by reference herewithin. However, wind deflectors of this type merely pivot and do not slide to a retracted position. Thus, such a wind deflector limits the roof opening that would otherwise be disposed above the front seat occupants.

U.S. Pat. No. 4,786,102 entitled "Sun Roof Apparatus of Vehicle Roof" which issued to Sakamoto et al. on Nov. 22, 1988, attempts to further increase the effective roof opening, especially above the front seat, by employing a pair of movable covering panels. This device provides a rear cover panel which is detachably removable such that a front cover panel can be rearwardly slid. Provisions are also made for manually mounting the removed rear cover panel upon the retracted front cover panel. However, this system appears ungainly to operate especially while driving the automobile.

U.S. Pat. No. 5,197,779 entitled "Power Sliding Sunroof" which issued to Mizuno et al. on Mar. 30, 1993, discloses a pair of slidable sunroofs mounted in tracks on top of a stationary roof. The disclosure of this patent is incorporated by reference herewithin. However, this non-flush roof system is aesthetically prominent, is prone to excessive wind noise during vehicle driving and will cause excessive aerodynamic drag in all operating positions.

Various manual and motorized driving mechanisms have been used in combination with the aforementioned sunroofs. For motorized actuation, various electrical circuits have been employed to control operation of the operating mechanisms. One such circuit and switch for energizing a motorized drive is disclosed within U.S. Pat. No. 4,556,835 entitled "Operating Mechanism for Movable Parts, Especially for Sliding Roofs and Sliding/Lifting Roofs" which issued to Vogel et al. on Dec. 3, 1985, and is incorporated by reference herewithin. Another such circuit is discussed within UK Patent Application GB 2077461 entitled "Operating Mechanism for Tilting and Sliding Roof Panels." These circuits and switches, however, do not provide a means for controlling a pair of movable panes, a pair of movable sunshades, or any combination thereof.

In accordance with the present invention, the preferred embodiment of a sunroof assembly of an automotive vehicle employs dual sunroof panes, a pair of movable sunshades and a control system for operating the function thereof. In one aspect of the present invention, a sunroof assembly provides a substantially transparent front pane which is slidable from a covering position to a retracted position and a substantially transparent rear pane movable from a covering position to an open position. At least one of the panes is retractable below a stationary roof of the automotive vehicle. In another aspect of the present invention, a sunroof assembly provides a pair of substantially transparent panes in combination with a substantial opaque front sunshade and a substantially opaque rear sunshade. The sunshades are movable from a functional position to a stowed position. In a further aspect of the present invention, a control system provides an electric switch assembly, electrical circuit and software for operating the panes and sunshades. A unique sunshade guide rail system is also provided. The sunroof assembly of the present invention further employs a drain trough attached to a movable pane.

The sunroof assembly of the present invention provides many advantages over conventional sunroof constructions. For example, the present invention sunroof assembly allows for an increased roof opening when the panes are retracted and an increased daylight opening (or glass coverage space) when the panes are in a covering position. The sunroof assembly of the present invention is also easily operable to a fully or partially retracted position even while the vehicle is being driven. The present invention further employs a unique arrangement for stowing a pair of panes and sunshades in order to minimize headroom intrusion below the roof surface without increasing aerodynamic drag, wind noise or unsightliness when the panes are in their covering and unretracted positions. The control system of the present invention is advantageous over conventional systems by providing an easily accessible and operable switch, circuit and software for facilitating easy driver use which is also quite cost effective and efficiently constructed. The present invention control system prevents inadvertent collisions between panes and sunshades. Additional advantages and features of the present invention will become apparent from the following description and appended claims, taken in conjunction with the accompanying drawings.

BRIEF DESCRIPTION OF THE DRAWINGS

FIG. 9 is a perspective view showing a preferred embodiment drain trough attached to a pane of the present invention sunroof assembly of FIG. 1;

FIG. 10 is a sectional view, taken along line 10—10 of FIG. 9, showing the preferred embodiment drain trough of the present invention sunroof assembly;

FIG. 11 is a sectional view, taken along line 11—11 of FIG. 9, showing the preferred embodiment drain trough of the present invention sunroof assembly;

FIGS. 12a–12c are longitudinal sectional views, also taken along line 2—2 of FIG. 1, showing the various positions of the preferred embodiment sunshades in relation to first preferred embodiment sets of guide rails of the present invention sunroof assembly;

FIG. 13 is a longitudinal sectional view, also taken along line 2—2 of FIG. 1, showing the preferred embodiment sunshades in relation to second preferred embodiment sets of guide rails of the present invention sunroof assembly;

FIG. 14 is a longitudinal sectional view, also taken along line 2—2 of FIG. 1, showing the preferred embodiment sunshades in relation to an alternate embodiment set of guide rails of the present invention sunroof assembly.

DETAILED DESCRIPTION OF THE PREFERRED EMBODIMENTS

Figure 1:
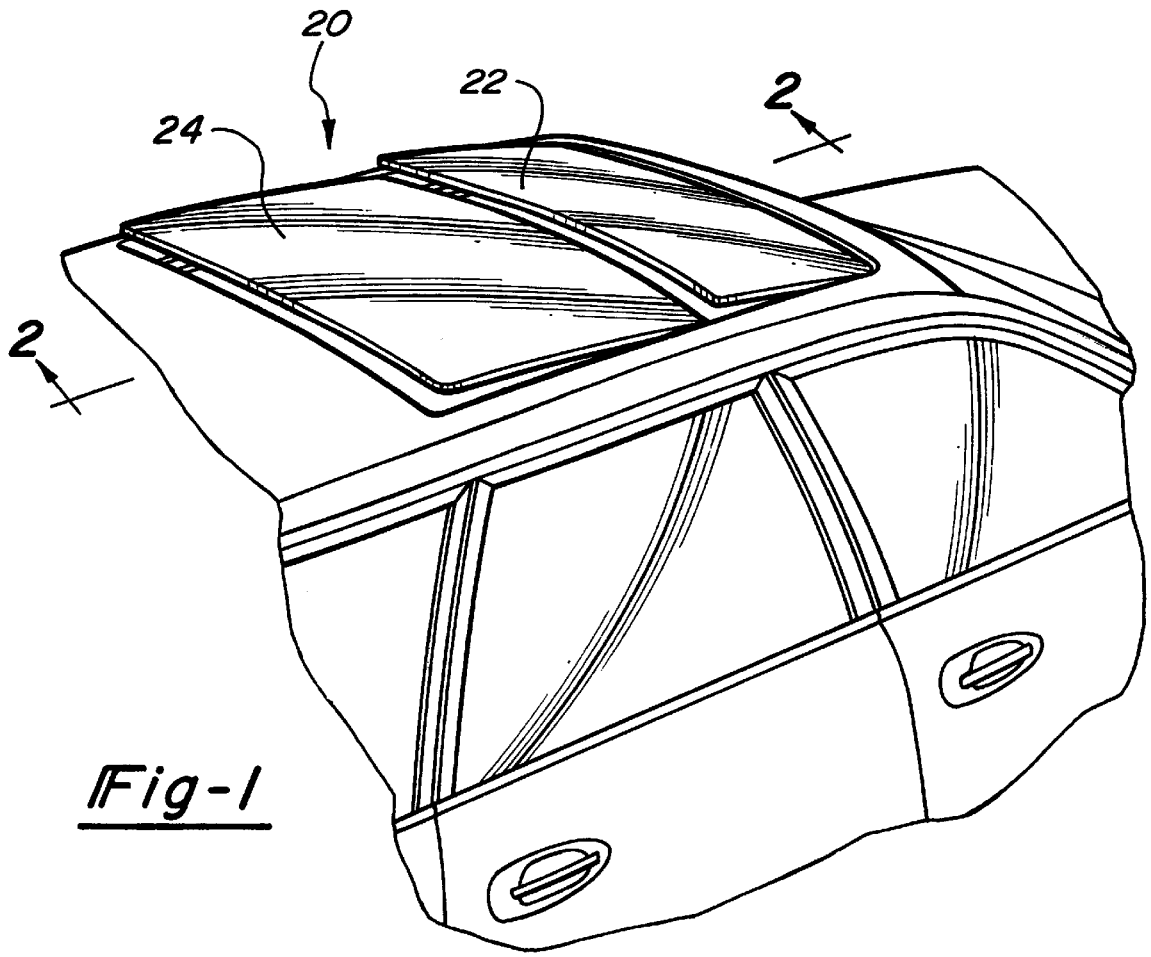
FIG. 1 is a rear perspective view showing a preferred embodiment of a sunroof assembly of the present invention employed in an automotive vehicle.

Referring to FIGS. 1 through 11, a preferred embodiment of a sunroof assembly 20 of the present invention has a front glass pane 22, a rear glass pane 24, a front sunshade 26, a rear sunshade 28, an operating mechanism, an electric switch assembly 30, a control system 32 and a drain trough. Sunroof assembly 20 is of a dual pane variety. Thus, both panes 22 and 24 can be opened to retracted positions to allow significantly increased sunlight and ventilation access through an opening within a stationary vehicle roof 40. As will be discussed in detail hereinafter, sunroof assembly 20 is optimally operated by control system 32 which is, in turn, activated by the conveniently accessible switch assembly 30.

Figure 2A:
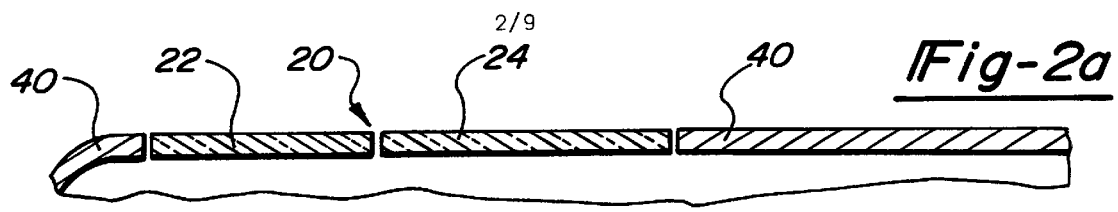
FIGS. 2a through 2h are diagrammatic longitudinal sectional views, taken along line 2—2 of FIG. 1, showing the various positions of a preferred embodiment of front and rear panes employed in the present invention sunroof assembly.
Figure 2B:
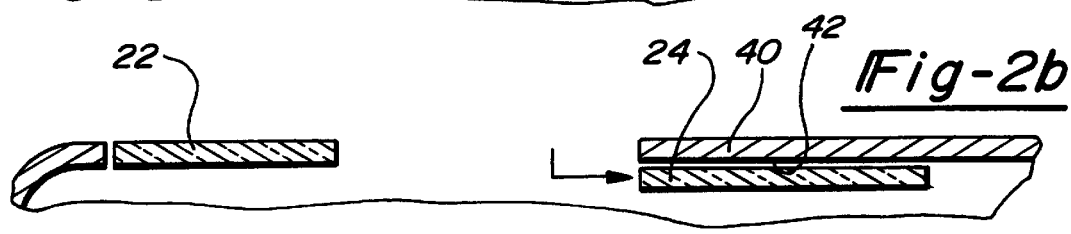
Figure 2C:
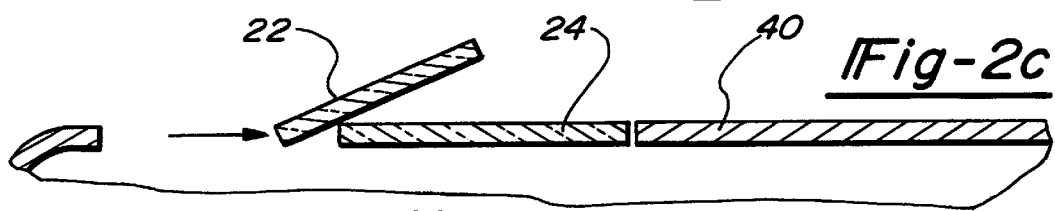

The various pane positions are as follows. As can best be observed in FIG. 2a, front and rear panes 22 and 24, respectively, are nominally disposed in a covering or closed position substantially flush and sealed to roof 40. Referring to FIG. 2b, rear pane 24 is slidably movable to a retracted position below an inside surface 42 of roof 40. Rear pane 24 can also be moved to any intermediate position between its covering and retracted positions. In this operating condition, front pane 22 can be left in its covering position. FIG. 2c shows rear pane 24 left in its covering position while front pane 22 is moved to a partially retracted position defined by a majority of front pane 22 being angled above rear pane 24. It should be noted that an open position is defined as including both the retracted and vent positions as applied to the front and rear panes, respectively 22 and 24, and the sunshades 26 and 28 (see FIG. 3e).

Figure 2D:
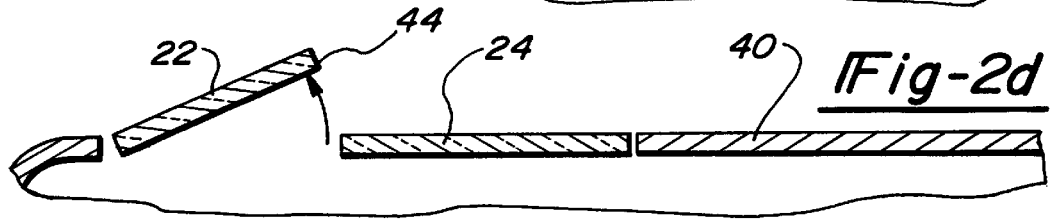
Figure 2E:
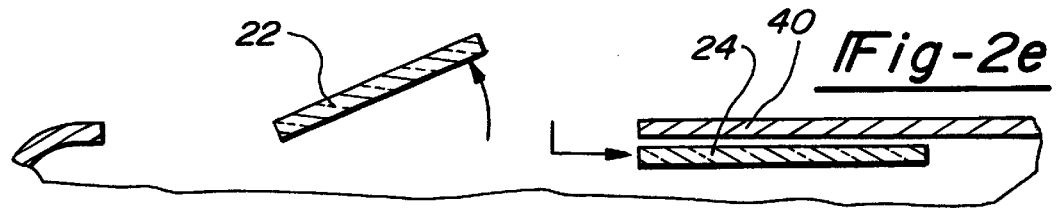
Figure 2F:
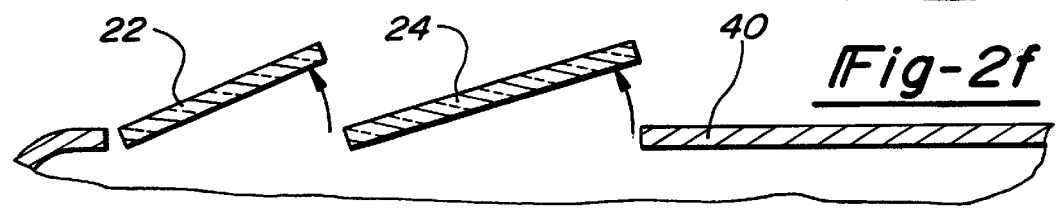
Figure 2G:
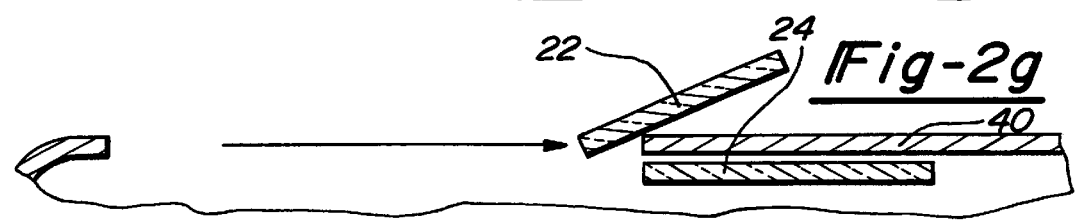
Figure 2H:
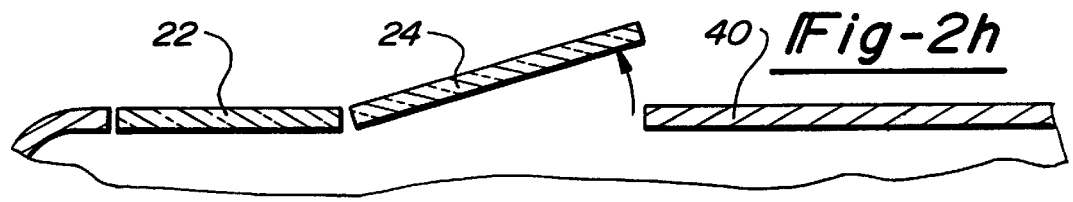

As can be observed in FIG. 2d, front pane 22 is pivoted to a vent position having a rear edge 44 tilted above roof 40. Rear pane 24 remains in its covering position. FIG. 2e depicts rear pane 24 slidably moved to its retracted position below roof 40 while front pane 22 is located in its partially retracted and vent position. FIG. 2f shows both front and rear panes, respectively 22 and 24, pivoted to their vent positions. Referring to FIG. 2g, rear pane 24 is slid to its retracted position below roof 40 and front pane 22 is in its fully retracted position substantially above roof 40. This position serves to minimize head room intrusion while allowing maximum roof opening over the front and rear seats. As can be observed in FIG. 2h, front pane 22 remains in its covering position and rear pane 24 is pivoted to its vent position.

An operating mechanism is used to operatively move and retain panes 22 and 24 as well as sunshades 26 and 28. The operating mechanism employed with the present invention is of a conventional variety such as that disclosed within U.S. Pat. Nos. 5,184,870 entitled "Raisable-Sliding Roof of Shallow Construction for Motor Vehicles" which issued to Bauhof on Feb. 9, 1993, and 4,671,564 entitled "Ventilating Device for a Roof Opening of Vehicles" which issued to Sumida et al. on Jun. 9, 1987, the disclosures of which are incorporated by reference herewithin. The operating mechanism includes the necessary guide rails, drain troughs, motors, cables, linkages and casings. However, various modifications were made to the guide rails and drain trough in order to optimize the dual sunroof construction of the present invention.

Figure 3A:
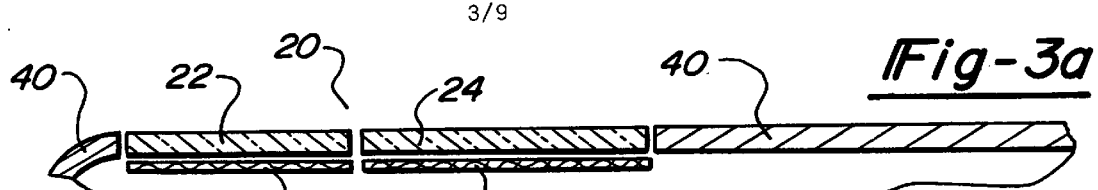
FIGS. 3a through 3e are diagrammatic longitudinal sectional views, also taken along line 2—2 of FIG. 1, showing a preferred embodiment of front and rear sunshades employed in the present invention sunroof assembly.
Figure 3B:
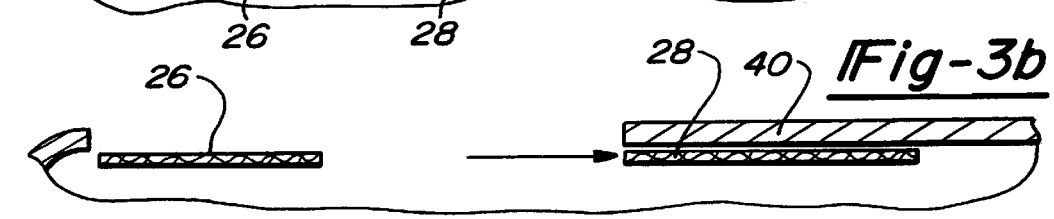
Figure 3C:
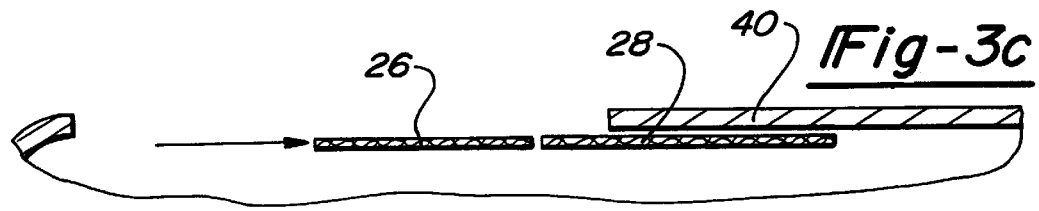
Figure 3D:
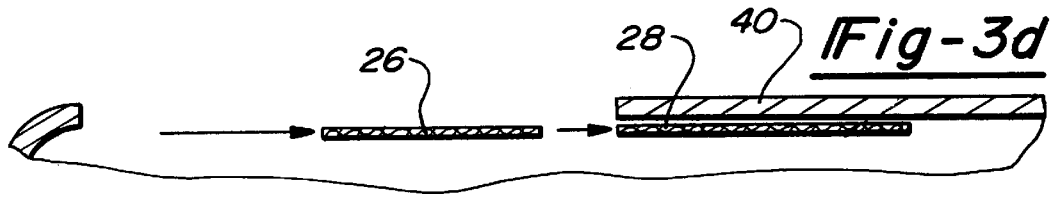
Figure 3E:
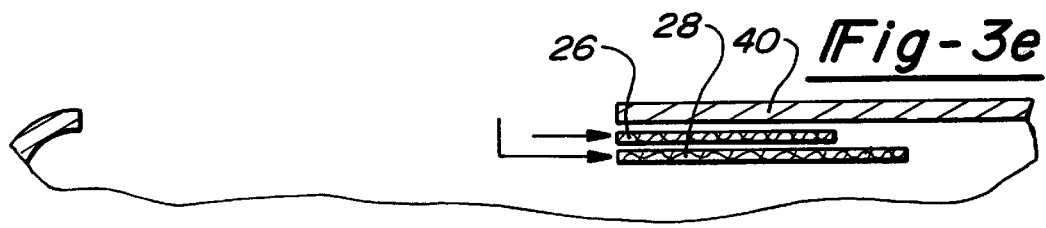

FIGS. 3a through 3e show the various operating positions of front sunshade 26 and rear sunshade 28. In FIG. 3a, front and rear sunshades 26 and 28 are disposed in their functional or closed locations juxtapositioned below their respective front and rear panes 22 and 24. FIG. 3b discloses rear sunshade 28 slidably moved to its stowed or open position below roof 40. This allows sunlight to enter through either rear pane 24 (see FIG. 3a) or the opening within roof 40. Referring to FIG. 3c, rear sunshade 28 is moved to an intermediate position while front sunshade 26 is slidably moved to a partially retracted position. Thus, front and rear sunshades 26 and 28, respectively, block sunlight from entering the area below rear pane 24 (see FIG. 3a). As can be seen in FIG. 3b, rear sunshade 28 is fully stowed while front sunshade 26 is moved to an intermediate position. FIG. 3e shows both front and rear sunshades 26 and 28, respectively, slidably moved to their respective stowed positions below roof 40.

Referring to FIGS. 9–11 and 15, a preferred embodiment of a drain trough 500 is movably mounted proximate to a rear edge 502 of each pane 22 and 24. However, drain trough 500 may additionally extend around other portions of the periphery of each one or both panes 22 and 24. In this embodiment, the pane preferably slides but does vent. Drain trough 500 has a C-shaped clasping portion 510 which is encapsulation molded, through conventional PVC or RIM processes, upon a peripheral portion of the substantially horizontal surfaces and rear edge 502 of each pane. A first leg 504 integrally extends angularly below clasping portion 510 and joins with a bottom portion 506. A second leg 508 outwardly and upwardly extends from bottom portion 506 thereby forming a substantially U-shaped cross sectional construction. A flange seal 512 is adhesively mounted upon a distal end of second leg 508 and a compression seal 514 is adhered to clasping portion 510 for sealing to the adjacent roof 40 and casing. While drain trough 500 is preferably molded as a single elastomeric member, first leg 504 may alternately be separately formed from metal, a polymeric resin, or a composite material, and then screwed or adhered to clasping portion 510, or directly to a pane. Of course, drain trough 500 may be defined by a variety of other shapes as long as it is movably attachable to a pane. Clasping portion 510 may alternately be flush molded upon a pane.

Figure 16:
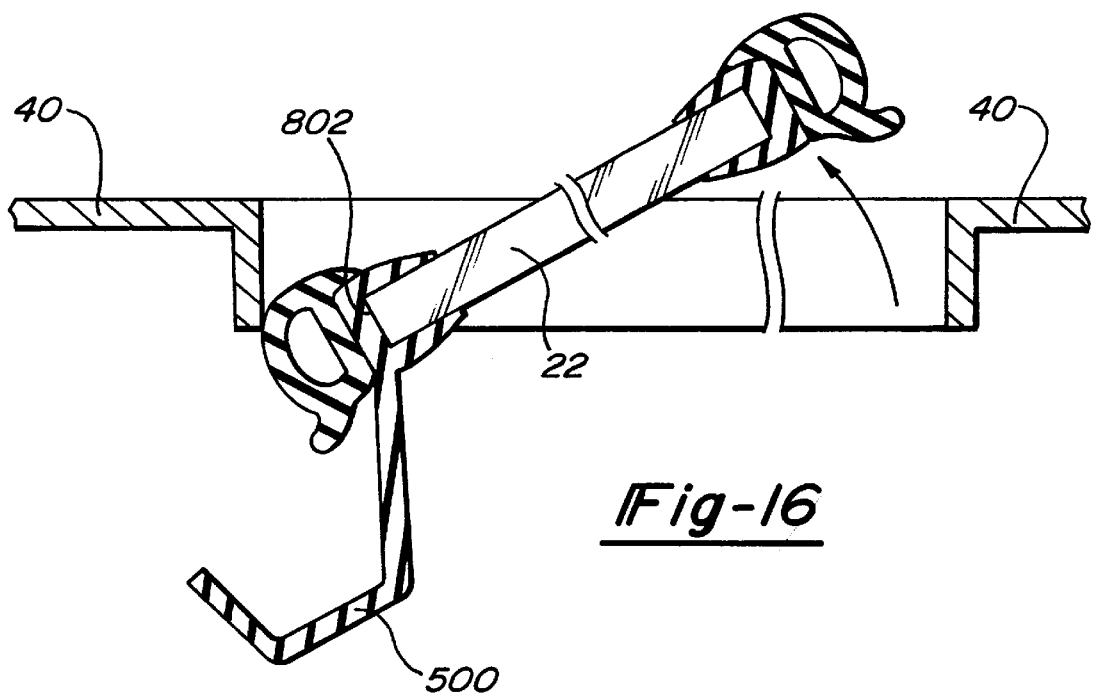
FIG. 16 is a longitudinal sectional view, taken along line 2—2 of FIG. 1, showing an alternate embodiment drain trough of the present invention in relation to a roof.

An alternate embodiment drain trough 500 is shown in FIG. 16. This drain trough 500 is attached to a front edge 802 of each pane 22 and 24 so as not to intrude within the passenger compartment and to allow for venting movement of each pane. Panes 22 and 24 may also slide within a single set of guide rails.

A first preferred embodiment, as shown in FIGS. 12a–12c, employs a first set of guide rails 61 having an access slot 62 and ramp 63 therein. A forward pivotable coupling means 64 attached to front sunshade 26 is sized larger than slot 62 and, thus, slides along an upper branch 65 of guide rails 61. A rearward pivotable coupling means 66 is attached to front sunshade 26 and is sized to enter slot 62 and slide down ramp 63 and along a lower branch 68 of guide rail 61 when in its covering position. A coupling means (not shown) is attached to rear sunshade 28 for slidable engagement with a second set of guide rails 69. This embodiment prevents an aesthetically undesirable step between front and rear sunshades 26 and 28, respectively. The appearance is further enhanced by crowning the sunshades.

Referring to FIG. 13, the second preferred embodiment of the present invention sunroof assembly provides a coupling means 54 connected to front sunshade 26 for slidable engagement within a first set of guide rails 56. Similarly, a second coupling means 58 is connected to rear sunshade 26 for providing slidable engagement within a substantially parallel second set of guide rails 60. Moreover, synchronous movement between sunshades 26 and 28 is not required within the preferred embodiments to avoid undesirable collisions.

An alternate embodiment guide rail construction is shown in FIG. 14. In this embodiment, a coupling means 70 and 71 for both front and rear sunshades, respectively 26 and 28, are slidably engaged within a single set of guide rails 72. Guide rails 72 include an access slot 73 disposed within a median surface 74 and a ramp 76 positioned adjacent to slot 73 for downwardly directing a substantially identically sized forward and rearward set of coupling means 71 of rear sunshade 28 for movement to the retracted position thereof below roof 40 (see FIG. 2g). Coupling means 70 of front sunshade 26 is larger than coupling means 71 of rear sunshade 28. Therefore, coupling means 70 can slide above slot 73 and ramp 76 for movement to their retracted position below roof 40.

Figure 4:
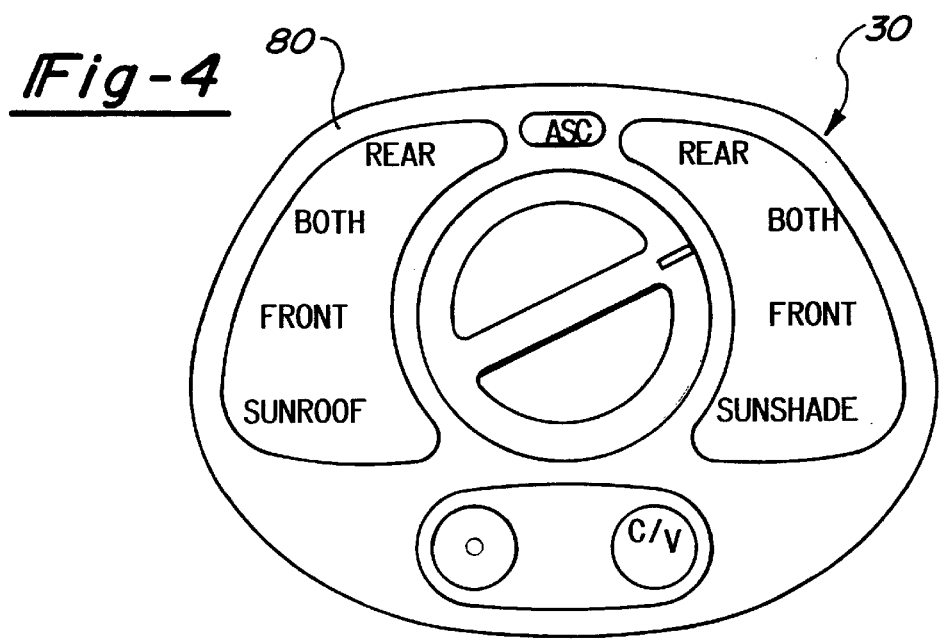
FIG. 4 is a true elevational view showing a preferred embodiment of an electrical switch assembly employed in combination with the sunroof assembly of the present invention of FIG. 1.
Figure 8:
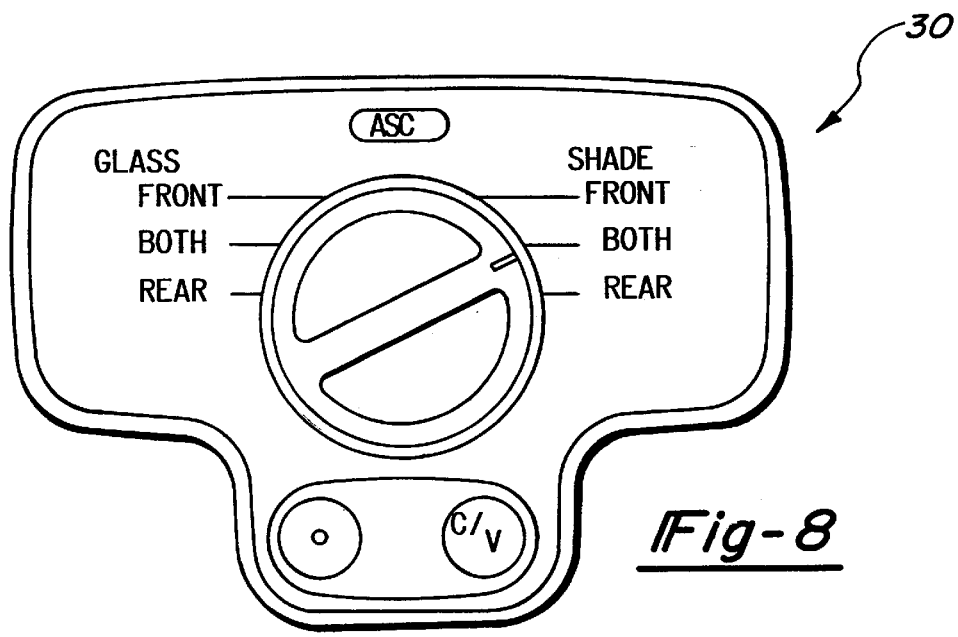
FIG. 8 is a true elevational view showing an alternate embodiment of the electrical switch assembly of the present invention of FIG. 4.
Figure 5:
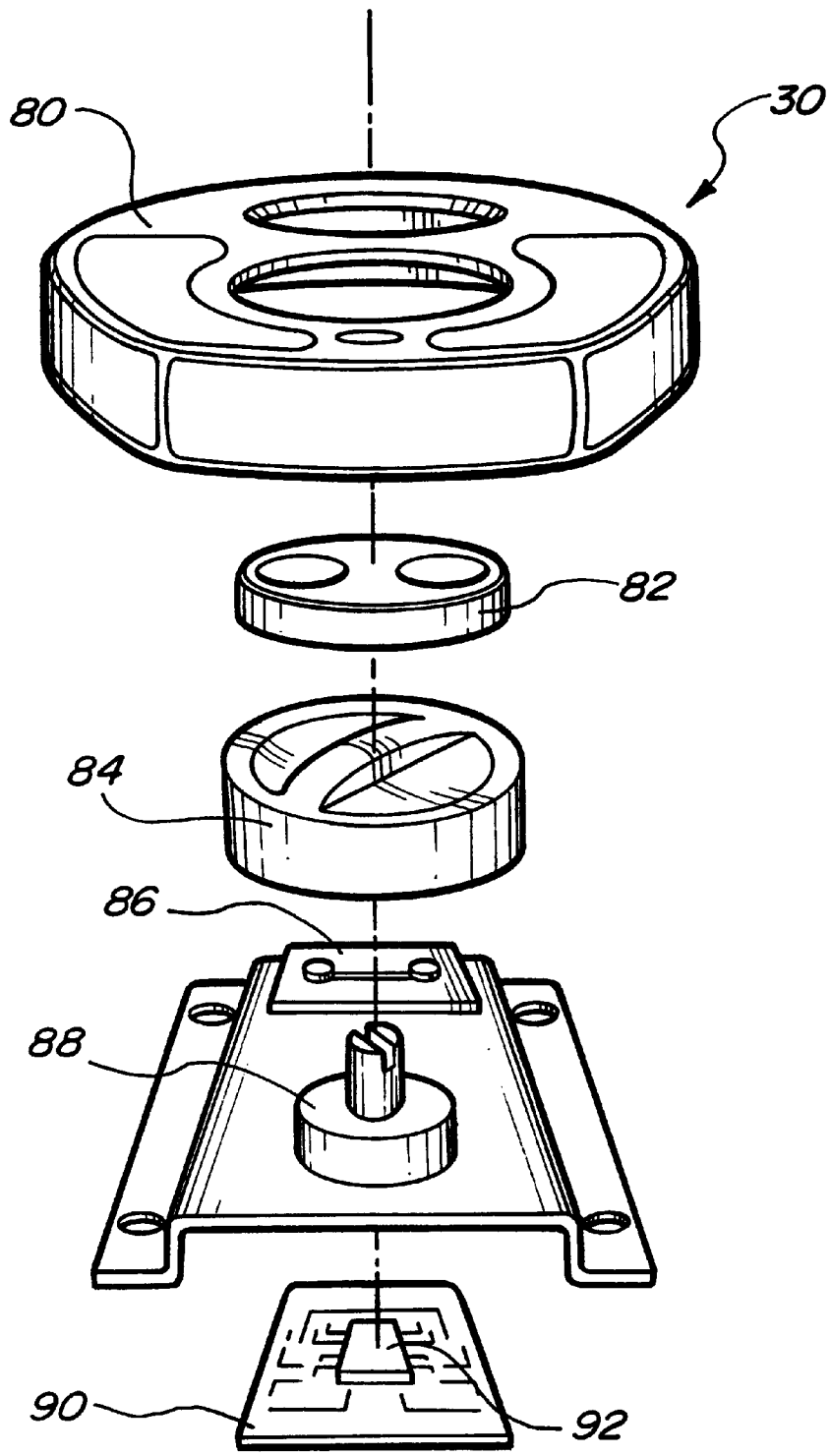
FIG. 5 is an exploded perspective view showing the preferred embodiment of the electrical switch assembly of FIG. 4.

The physical construction of the preferred embodiment of electrical switch assembly 30 can best be observed in FIGS. 4 and 5. Switch assembly 30 is mounted upon a headliner below a front header panel. Switch assembly 30 has a polymeric aesthetic bezel 80 with function selection graphics (eg., "sunroof," "front," "both," etc.) affixed thereto. Bezel 80 further has a pair of apertures through which project a polymeric rocker button 82 and a polymeric knob 84. Button 82 pivotably actuates a rocker switch 86 between an open "O", and a closed or vent "C/V" position. Knob 84 is rotatably engagable with a rotary dial switch 88. Rotary dial switch 88 is movable between sunroof-front, sunroof-both, sunroof-rear, ASC, sunshade-rear, sunshade-both and sunshade-front positions. The ASC position correlates to an all open/all closed position for both front and rear sunroofs and sunshades. Rocker switch 86 and rotary dial switch 88 are electrically connected to a printed circuit board 90 containing a microprocessor-based CPU 92. Switch assembly 30 is electrically coupled to printed circuit board 90 via multiplex wiring. However, conventional discrete wiring, metal traces or even fiber optic signal transmitting means can be employed. An alternate aesthetic embodiment of switch 30 of the present invention is shown in FIG. 8.

Figure 6:
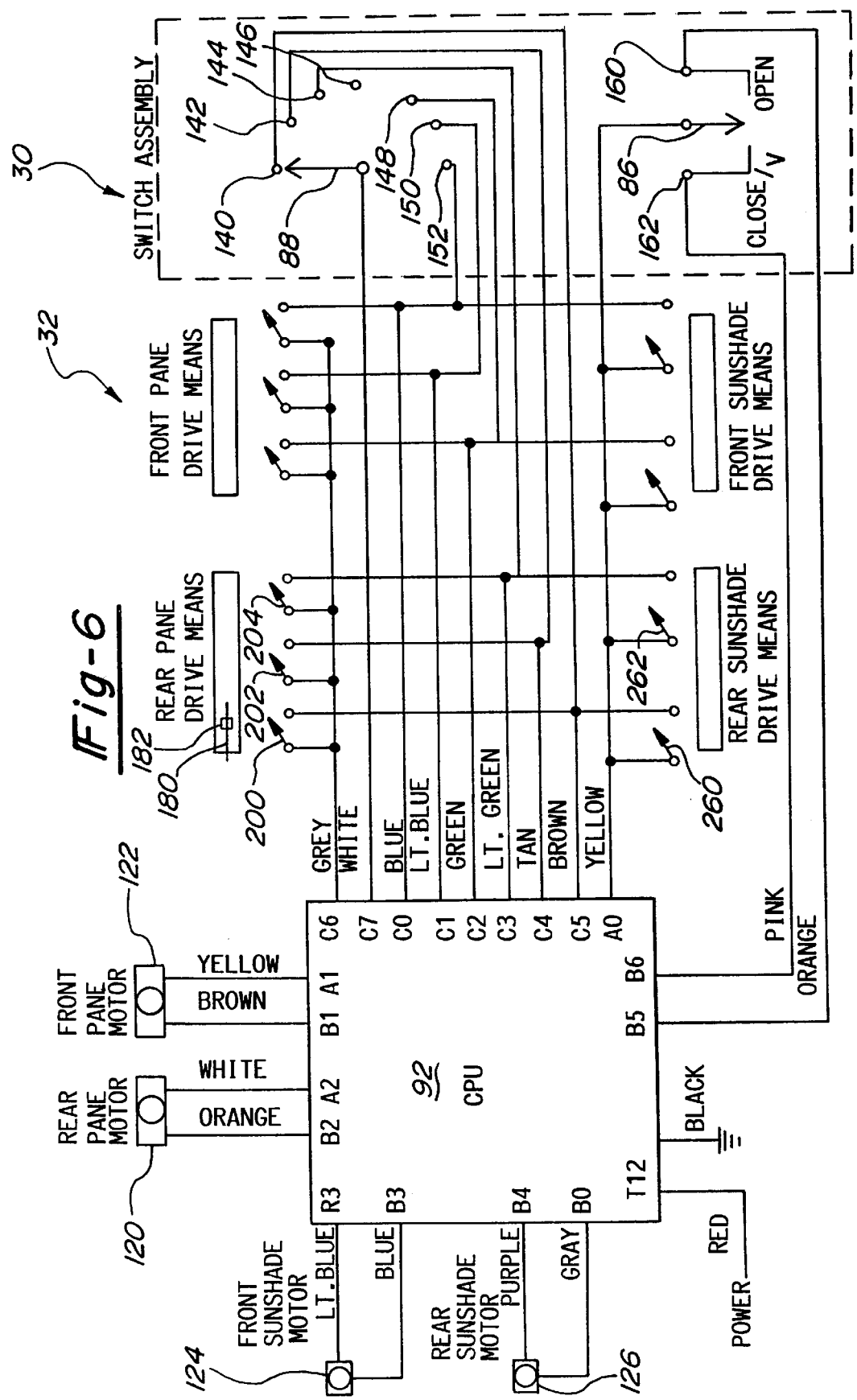
FIG. 6 is an electrical circuit diagram of the preferred embodiment control system employed to operate the sunroof assembly of the present invention of FIG. 1.

In one preferred embodiment of the present invention, electric switch assembly 30 serves to selectively operate control system 32 in order to cause the operating mechanism to move panes 22 and 24 as well as sunshades 26 and 28. Referring to FIG. 6, CPU 92 is preferably an off-the-shelf 24 pin PIC16C57 microchip which can be purchased from Digi-key of Thief Riverfalls, Minn. CPU 92 can selectively energize a rear pane motor 120, a front pane motor 122, a front sunshade motor 124 and a rear sunshade motor 126. Rotary dial switch 88 is electrically connected to CPU 92 for selectively switching between sunroof-front position 140, sunroof-both position 142, sunroof-rear position 144, ASC position (no current flow through the switch) 146, sunshade-rear position 148, sunshade-both position 150 and sunshade-front position 152. Rocker switch 88 is also electrically connected to CPU 92 so as to be energizable between open position 160 and closed/vent position 162.

A plurality of limit switches or other position sensing devices are electrically connected to CPU 92. In coordination with the limit switches, and as part of the operating mechanism to move the panes and sunshades, a drive means includes a cable 180 having a magnetic device 182 attached thereto. Rear pane motor 120 is of a DC fractional horsepower type having a pinion gear which drives cable 180. Cable 180 concurrently serves to move rear pane 24 (see FIG. 2b). A similar drive means is used for the other pane and the sunshades. In cooperation therewith, a first limit switch 200 senses a full closed or covering position of rear pane 24. A second limit switch 202 senses the vent position of rear pane 24. Furthermore, a third limit switch 204 senses the full open or retracted position of rear pane 24. These limit switches are operatively changed from a closed position to an open position and vice versa, by movement therepast of magnetic device 182. The limit switches associated with the front pane drive means operate in the same manner as that described for the rear pane drive means.

Magnetic device 182 associated with rear sunshade drive means serves to operate a fourth limit switch 260 and a fifth limit switch 262. Limit switch 260 senses the full open or stowed position of rear sunshade 28 (see FIG. 3b). Limit switch 262 senses the full closed or functional position of rear sunshade 28. Front sunshade drive means and limit switches act in a similar manner.

Figure 7:
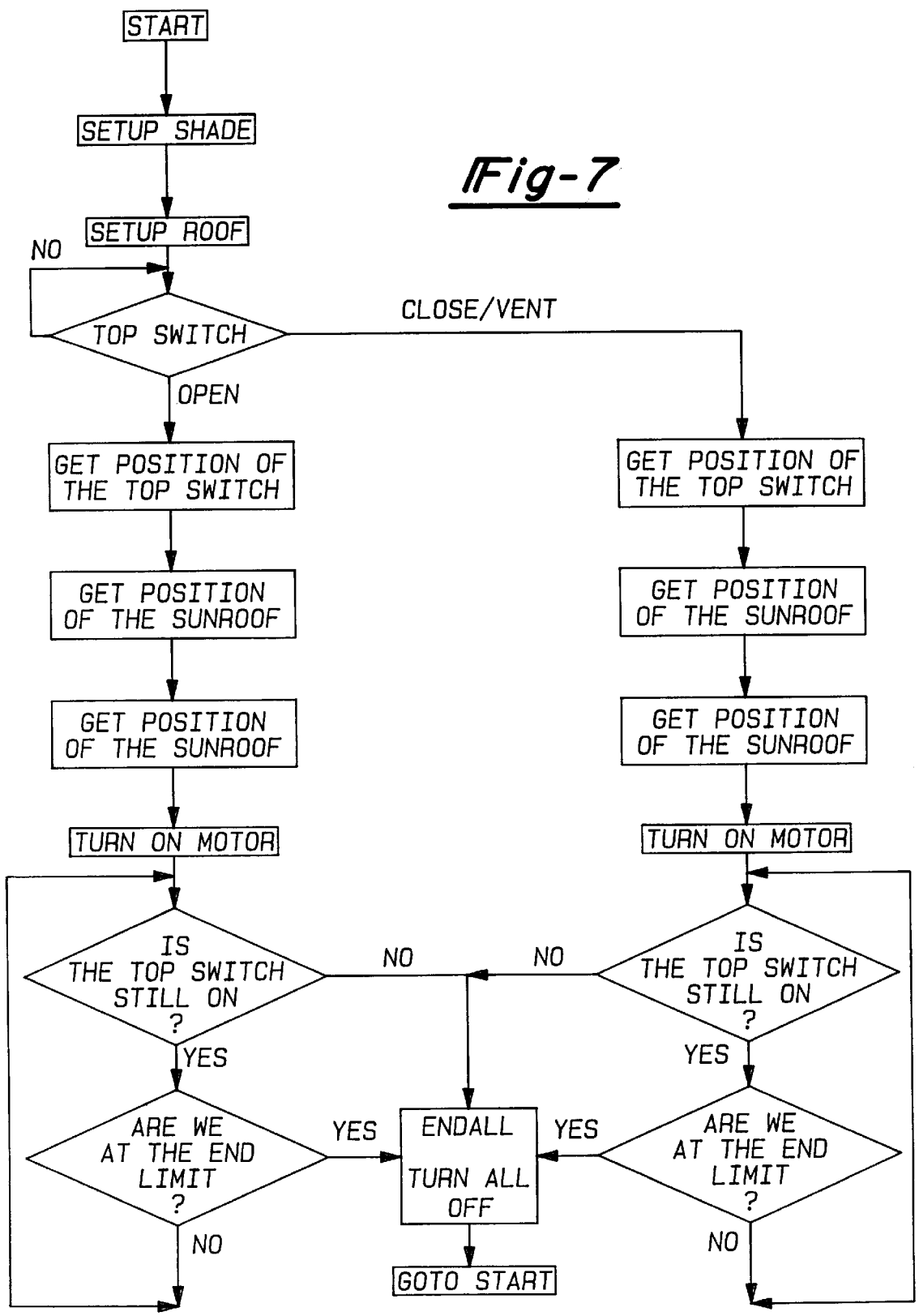
FIG. 7 is a flow chart of a computer process employed to operate the preferred embodiment of the control system and sunroof assembly of the present invention of FIGS. 1 and 6.
Figure 15:
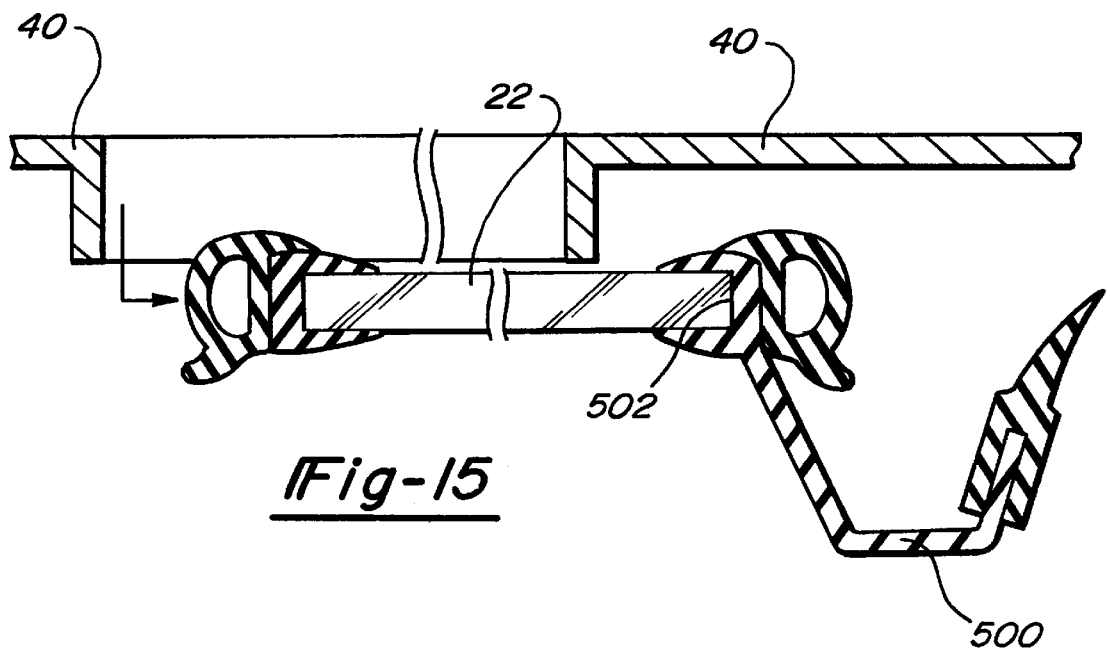
FIG. 15 is a longitudinal sectional view, taken along line 11—11 of FIG. 9, showing the preferred embodiment drain trough of the present invention in relation to a roof.

CPU 92 is controlled by software written in assembly language. A flow chart of this software is shown in FIG. 7. The assembly language code, referencing various circuits and pins shown in FIG. 6 is listed in the following Table 1.

TABLE 1

```
DEVICE PIC16C57,RC_OSC,WDT_OFF,PROTECT_OFF
            RESET    START
;
;OUTPUTS
;**************************
;
FglassO    =   ra.1    ;Yellow
FglassC    =   rb.1    ;Brown
RglassO    =   ra.2    ;White
RglassC    =   rb.2    ;Orange
FshadeO    =   ra.3    ;Lt Blue
FshadeC    =   rb.3    ;Blue
Rshadeo    =   rb.4    ;Pup
RshadeC    =   rb.0    ;Grey
MUXa       =   rc.6    ;Grey
MUXb       =   rc.7    ;White
MUXc       =   ra.0    ;Yellow
;
;
;INPUTS
;**************************
;*                          *
;*   a grounded bit = 1     *
;*   at the chip            *
;**************************
SW0        =   rc.0    ;blue      front glass front limit/sun front
SW1        =   rc.1    ;ltblue    front glass mid limit/sun both
SW2        =   rc.2    ;green     front glass rear limit/sun rear
;
SW3        =   rc.3    ;ltgrn     rear glass front limit/sun front
SW4        =   rc.4    ;tan       rear glass mid limit/sun both
SW5        =   rc.5    ;brown     rear glass rear limit/sun rear
;
;
SWopen     =   rb.5    ;org       main switch open
SWclose    =   rb.6    ;pink      main switch close
;
;
BANK0      =   08h
BANK3      =   09h
BANK2      =   0Ah
set        =   10h
base       =   11h
count      =   12h
debounce   =   13h
Aport      =   05h
Bport      =   06h
motordelay =   14h
modeREG    =   15h
temp       =   16h
portC      =   07h     ;port c
roofpos    =   0Bh
switchpos  =   0Ch
shadpos    =   0Dh
mask       =   0Eh
timer      =   0Fh
;   BANK 3 SUNSHADE
RRclFFcl   =   10h     ;RR = rear,cl=closed,FF=front,op=open,md
RRclFFmd   =   11h     ;xx = not at any switch
RRclFFop   =   12h
RRmdFFcl   =   13h
RRmdFFmd   =   14h
RRmdFFop   =   15h
RRopFFcl   =   16h
RRopFFmd   =   17h
RRopFFop   =   18h
RRxxFFcl   =   19h     ;USED ONLY FOR THE SUNROOF
RRxxFFmd   =   1Ah
RRxxFFop   =   1Bh
RRclFFxx   =   1Ch
RRmdFFxx   =   1Dh
RRopFFxx   =   1Eh
;ascSW         ds   1
;
;
;
;
START  org   0
       mov   FSR,#0000 0000b
```

TABLE 1-continued

```
        mov    Ira,#00000000b      ;1=input
        mov    Irb,#01100000b      ;0=input
        mov    Irc,#00111111b
        clrb   FglassO
        clrb   FglassC
        clrb   RglassO
        clrb   RglassC
        clrb   FshadeO
        clrb   FshadeC
        clrb   RshadeO
        clrb   RshadeC
        mov    BANK0,#0000 0000b
;       mov    BANK1,#0010 0000b
        mov    BANK2,#0100 0000b
        mov    BANK3,#0110 0000b
    ;   call   shortdelay
;************************************************************
;SHADE SETUP
        mov    FSR,bank3          ;set bank 3
;                      RRR FFF
;              xx omc omc
        mov    RRclFFCl,#00 001 001b    ;used for both shade &roof
        mov    RRclFFmd,#00 001 000b
        mov    RRclFFop,#00 001 100b
        mov    RRmdFFcl,#00 000 001b
        mov    RRmdFFmd,#00 000 000b
        mov    RRmdFFop,#00 000 100b
        mov    RRopFFcl,#00 100 001b
        mov    RRopFFmd,#00 100 000b
        mov    RRopFFop,#00 100 100b
        mov    mask,#00111111b          ;mask data input from sw
;************************************************************
; ROOF SETUP
        mov    FSR,BANK2
;                      RRR FFF
;              xx omc omc
        mov    RRclFFcl,#00 001 001b    ;used for both shade &roof
        mov    RRclFFmd,#00 001 010b
        mov    RRclFFop,#00 001 100b
        mov    RRclFFxx,#00 001 000b
        mov    RRmdFFcl,#00 010 001b
        mov    RRmdFFmd,#00 010 010b
        mov    RRmdFFop,#00 010 100b
        mov    RRmdFFxx,#00 010 000b
        mov    RRopFFcl,#00 100 001b
        mov    RRopFFmd,#00 100 010b
        mov    RRopFFop,#00 100 100b
        mov    RRopFFxx,#00 100 000b
        mov    RRxxFFcl,#00 000 001b
        mov    RRxxFFmd,#00 000 010b
        mov    RRxxFFop,#00 000 100b
        ljmp   page1
;************************************************************
page1   org    513
swoff   jb     Swopen,swoff
        jb     SWclose,swoff
MAIN    jb     SWopen,run
        jb     SWclose,run
:loop   djnz   timer,:loop
        jmp    MAIN
RUN     call   scanSWpos
        csne   switchPOS,100000000b   ;ASC pos.
        jmp    bothshad
        cjbe   switchpos,#00000111b,bothshad
        cja    switchpos,#00000111b,bothroof
;       jmp    bothroof
        jmp    MAIN
;************************************************************
scanSWpos   mov    FSR,bank3       ;switch pos
            setb   MUXa
            setb   MUXb
            setb   MUXc
            clrb   MUXa
            mov    timer,#10
            clrb   MUXa
:loop       djnz   timer,:loop
            mov    switchpos,portc
            and    switchpos,MASK
            setb   MUXa
```

TABLE 1-continued

```
              setb   MUXa
              ret
scanSHpos     mov    FSR,bank3          ;sunshade pos
              setb   MUXa
              setb   MUXb
              setb   MUXc
              clrb   MUXc
              mov    timer,#10
              clrb   MUXc
:loop         djnz   timer,:loop
              move   shadpos,portc
              and    shadpos,MASK
              setb   MUXc
              setb   MUXc
              ret
scanSRpos     mov    FSR,bank2          ;roof pos
              setb   MUXa
              setb   MUXb
              setb   MUXc
              clrb   MUXb
              mov    timer,#10
              clrb   MUXb
:loop         djnz   timer,:loop
              mov    roofpos,portc
              and    roofpos,MASK
              setb   MUXb
              setb   MUXb
              ret
;*****************************************************************
;shortdelay   mov    motordelay,#160    ;motor running delay
;
;:Mdelay      mov    set,#1             ;if count =05 then set=1
                                        ;if count =50 then set=16
                                        ;if count =250 then set=83
              mov    count,#05          ;must be 5,50 or 250    ;1
              mov    base,#250                                  ;1
;:offset      djnz   set,:offset        ;loop set times         48
;;:loop       dec    base               ;loop 250 times        250
;             nop                       ;+1 to count           250
;             nop                       ;+1 to count           250
;             nop                       ;+1 to count           250
;             nop                       ;+1 to count           250
;             nop                       ;+1 to count           250
;             jnz    :loop              ;                      500
;             ;                            first loop         2000
;             djnz   count,:loop        ;loop 5 times         9995
;      ;      djnz   motordelay,:mdelay
;             ret                       ;loop 50 times       l99950
                                        ;loop 250 times      499750
;;IF COUNT IS 5   THEN TOTAL TICKS =10000      @IOMhz = .001 sec
;;IF COUNT IS 50  THEN TOTAL TICKS =100000     @IOMhz = .01 sec
;;IF COUNT IS 250 THEN TOTAL TICKS =500001     @IOMhz = .05 sec
;*****************************************************************
;;
;*****************************************************************
;;
;bounceA      mov    FSR,banko
;             mov    set,#16            ;if count =05 then set=1
;                                       ;if count =50 then set=16
;                                       ;if count =250 then set=83
;             mov    count 150          ;must be 5,50 or 250    ;1
;             mov    base,#250                                  ;1
;:offset      djnz   set,:offset         loop set times         48
;:loop        dec    base               ;loop 250 times        250
;             nop                       ;+1 to count           250
;             nop                       ;+1 to count           250
;             nop                       ;+1 to count           250
;             nop                       ;+1 to count           250
;             nop                       ;+1 to count           250
;             jnz    :loop              ;                      500
;             ;                            first loop         2000
;             djnz   count,:loop         ;loop 5 times         9995
;
;             ret                       ;loop 50 times        99950
                                        ;loop 250 times      499750
;;IF COUNT IS 5   THEN TOTAL TICKS =10000      @IOMhz = .001 sec
;;IF COUNT IS 50  THEN TOTAL TICKS =100000     @IOMhz = .01 sec
;;IF COUNT IS 250 THEN TOTAL TICKS =500001     @IOMhz = .05 sec
;*****************************************************************
;;
```

TABLE 1-continued

```
;;************************************************************
EndALL      clrb    FglassO
            setb    rshadeC
            clrb    FlgassC
            clrb    RglassO
            clrb    RglassC
            clrb    FshadeO
            clrb    RshadeO
            clrb    RshadeC
            jmp     swoff
test        setb    fglassc
            setb    rglassc
            jmp     test
;************************************************************
bothshad    jb      SWopen,:open
            jb      SWclose,:close
            jmp     endALL
:open       call    scanSWpos                       ;asc pos
            cje     switchpos,#0000 0000b,:both     ;asc pos
            and     switchpos,#000 0111b
            cje     switchpos,#0000 0001b,:onlyfront
            cje     switchpos,#0000 0010b,:both
            cje     switchpos,#0000 0100b,:onlyrear
      ;     jmp     test
            jmp     endAll
:both       call    scanSHpos
            AND     shadpos,#00 000 100b
            cje     shadpos,RRmdFFop,:endF
            setb    FshadeO
:rear       call    scanSHpos
            AND     shadpos,RRmdFFop,:endF
            setb    FshadeO
:rear       call    scanSHpos
            AND     shadpos,#00 100 000b
            cje     shadpos,RRopFFmd,:endR
            setb    RshadeO
            call    scanSWpos                       ;asc pos
            cje     switchpos,#0000 0000b,bothroof  ;asc pos check
            jmp     bothshad
:endF       clrb    FshadeO
            clrb    FshadeC
            call    scanSWpos
            jmp     :rear
:endR       clrb    RshadeO
            clrb    RshadeC
            call    scanSWpos                       ;asc pos check
            cje     switchpos,0000 0000b, bothroof  ;asc pos check
            jmp     bothshad
:onlyfront  call    scanSWHpos
            AND     shadpos,#00 000 100b
            cje     shadpos,RRmdFFop,endAll
            setb    FshadeO
            jmp     bothshad
:onlyrear   call    scanSHpos
            AND     shadpos,#00 100 000b
            cje     shadpos,RRopFFmd,endAll
            setb    RhadeO
            jmp     bothshad
:close      call    scanSRpos
            AND     roofpos,#00 001 001b
            cje     roofpos,RRclFFcl,:OK
            call    scanSWpos                       ;asc pos
            cje     switchpos,#0000 0000b,bothroof  ;asc pos
            jmp     endAll
:OK         call    scanSWpos                       ;asc pos
            cje     switchpos,#0000 0000b,:Cfront   ;asc pos
            call    scanSHpos
            and     switchpos,#0000 0111b
            cje     switchpos,#0000 0001b,:Conlyfront
            cje     switchpos,#0000 0010b,:Cfront
            cje     switchpos,#0000 0100b,:Conlyrear
            jmp     endAll
;
;
:Cfront     call    scanSHpos
            AND     shadpos,#00 000 001b
            cje     shadpos,RRmdFFcl,:endCF
            setb    FshadeC
:Crear      call    scanSHpos
```

TABLE 1-continued

```
              AND   shadpos,#00 001 000b
              cje   shadpos,RRclFFmd,:endCR
              setb  RshadeC
              jmp   bothshad
:endCF        clrb  FshadeO
              clrb  FshadeC
              jmp   bothshad
:Conlyfront   call  scanSHpos
              AND   shadpos,#00 000 001b
              cje   shadpos,RRmdFFcl,:endCF
              setb  FshadeC
              jmp   bothshad
:Conlyrear    call  scanSHpos
              AND   shadpos,100 001 000b
              cje   shadpos,RRclFFmd,:endCR
              setb  RshadeC
              jmp   bothshad
;;****************************************************************
asc       ;   setb  ascSW
          ;   sb    ascSW
          ;   jmp   endAll
          ;   setb  FglassC
          ;   jmp   asc
              jmp   bothshad
;****************************************************************
rearroof      jmp   endAll
;;****************************************************************
;
bothroof      jb    SWopen,:open
              jb    SWclose,:checkR              ;goto vent or close
              jmp   endALL
:checkR       call  scanSRpos
              AND   roofpos,#00 001 001b
              cje   roofpos,RRclFFcl,:bent
;             cje   roofpos,RRxxFFcl,:vent
;             cje   roofpos,RRclFFxx,:vent
              jmp   :close
:vent         call  scanSWpos
              and   switchpos,#0011 1000b
              cje   switchpos,#0010 0000b,:onlyfrontv
              cje   switchpos,#0001 0000b,:ventboth
              cje   switchpos,#0000 1000b,:onlyrearv
              jmp   endAll
:ventboth     call  scanSRpos
              AND   roofpos,#00 110 000b
              cje   roofpos,RRmdFFxx,:endRv
              cje   roofpos,RRopFFxx,:endRv
              setb  RglassO
:ventF        call  scanSRpos
              AND   roofpos,#00 000 110b
              cje   roofpos,RRxxFFmd,:endFv
              cje   roofpos,RRxxFFop,:endFv
              setb  FglassO
              jmp   ;vent
:endRv        clrb  RglassO
              jmp   :ventf
:onlyrearv    call  scanSRpos
              AND   roofpos,#00 110 000b
              cje   roofpos,RRmdFFxx,endAll
              cje   roofpos,RRopFFxx,endAll
              setb  RglassO
              jmp   :onlyrearv
:onlyfrontv   call  scanSRpos
              AND   roofpos,#00 000 110b
              cje   roofpos,RRxxFFmd,endAll
              cje   roofpos,RRxxFFop,endAll
              setb  FglassO
              jmp   :onlyfrontv
:open         call  scanSWpos                   ;asc pos check
              cje   switchpos,#0000 0000b,:front ;asc pos check
              and   switchpos,#0011 1000b
              cje   switchpos,#0010 0000b,:onlyfront
              cje   switchpos,#0001 0000b,:front
              cje   switchpos,#0000 1000b,:onlyrear
              jmp   endAll
:front        call  scanSRpos                   ;inter lock so that
              AND   roofpos,#00 100 000b        ;the front will not
              cse   roofpos,RRopFFxx            ;move until the rear
              jmp   :rear                       ;sunroof is open
```

TABLE 1-continued

|  |  |  |  |
|---|---|---|---|
|  | call | scanSRpos |  |
|  | AND | roofpos,#00 000 100b |  |
|  | cje | roofpos,RRxxFFop,:endF |  |
|  | setb | FglassO |  |
| :rear | call | scanSRpos |  |
|  | AND | roofpos,#00 100 000b |  |
|  | cje | roofpos,RRopFFxx,:endR |  |
|  | setb | RglassO |  |
|  | call | scanSWpos | ;asc pos check |
|  | cje | switchpos,#0000 0000b,bothshad | ;asc pos check |
|  | jmp | bothroof |  |
| :endF | clrb | FglassO |  |
|  | clrb | FglassC |  |
|  | jmp | :rear |  |
| :endR | clrb | RglassO |  |
|  | clrb | RglassC |  |
|  | jmp | bothroof |  |
|  | mov | timer,Bport |  |
|  | AND | timer,#00000110b |  |
|  | cje | timer,#00000000b,endAll |  |
|  | jmp | bothroof |  |
| :onlyfront | call | scanSRpos | ;inter lock so that |
|  | AND | roofpos,#00 100 000b | ;the front will not |
|  | cse | roofpos,RRopFFxx | ;move until the rear |
|  | jmp | bothroof | ;sunroof is open |
|  | call | scanSRpos |  |
|  | AND | roofpos,#00 000 100b |  |
|  | cje | roofpos,RRxxFFop,endAll |  |
|  | setb | FglassO |  |
|  | jmp | bothroof |  |
| :onlyrear | call | scanSRpos |  |
|  | AND | roofpos,#00 100 000b |  |
|  | cje | roofpos,RRopFFxx,endAll |  |
|  | setb | RglassO |  |
|  | jmp | bothroof |  |
| :close | jnb | SWclose,endAll |  |
|  | call | scanSWpos | ;asc pos check |
|  | cje | switchpos,#0000 0000b,:Cfront | ;asc pos check |
|  | call | scanSWpos |  |
|  | and | switchpos,#0011 1000b |  |
|  | cje | switchpos,#0010 0000b,:Conlyfront |  |
|  | cje | switchpos,#0001 0000b,:Cfront |  |
|  | cje | switchpos,#0000 1000b,:Conlyrear |  |
|  | jmp | endAll |  |
| :Cfront | call | scanSRpos |  |
|  | AND | roofpos,#00 000 001b |  |
|  | cje | roofpos,RRxxFFcl,:endCF |  |
|  | setb | FglassC |  |
| :Crear | call | scanSRpos | ;inter lock so that |
|  | AND | roofpos,#00 000 001b | ; the front will not |
|  | cse | roofpos,RRxxFFcl | ;move until the rear |
|  | jmp | :close | ;sunroof is open |
|  | call | scanSRpos |  |
|  | AND | roofpos,#00 001 000b |  |
|  | cje | roofpos,RRclFFxx,:endCR |  |
|  | setb | RglassC |  |
|  | jmp | :close |  |
| :endCF | clrb | FglassO |  |
|  | clrb | FglassC |  |
|  | jmp | :Crear |  |
| :endCR | clrb | Rglass O |  |
|  | clrb | RglassC |  |
|  | mov | timer,Bport | ;the motor port |
|  | AND | timer,#00000110b | ; |
|  | cje | timer,#00000000b,:okk | ;is the motor running |
|  | jmp | :close |  |
| :okk | call | scanSWpos | ;asc pos check |
|  | cje | switchpos,#0000 0000b,bothshad | ;asc pos check |
|  | jmp | endAll |  |
| :Conlyfront | call | scanSRpos |  |
|  | AND | roofpos,#00 000 001b |  |
|  | cje | roofpos,RRxxFFcl,endAll |  |
|  | setb | FglassC |  |
|  | jmp | :close |  |

TABLE 1-continued

```
:Conlyrear   call   scanSRnos
             AND    roofpos,#00 001 000b
             cje    roofpos,RRclFFxx,endAll
             setb   RglassC
             jmp    :close
;****************************************************************
;****************************************************************
frontroof    jmp    endall
;****************************************************************
;
;
;****************************************************************
;****************************************************************
;****************************************************************
;****************************************************************
;****************************************************************
;****************************************************************
;****************************************************************
;
```

In the aforementioned embodiment, the switch selectively energizes the control system and operating mechanism as follows. When both sunroof panes are in their covering positions and the rear sunroof open switch position is selected, the rear pane and rear sunshade open simultaneously to the position shown in FIGS. 2b and 3b. When both panes are closed and the front pane switch open position is selected, the front pane moves to the position shown in FIG. 2c and front sunshade moves simultaneously to the position shown in FIG. 3c. When both panes are in a covering position and the front pane vent switch position is selected, the front pane vents to the position shown in FIG. 2d while front sunshade simultaneously moves to the position of FIG. 3c. When front pane is either in a retracted or vented position (see FIGS. 2e and 2d, respectively), and the rear sunroof open switch position is selected, the front sunshade is already disposed at the position of FIG. 3c such that front and rear sunshades simultaneously move to the positions shown in FIG. 3e and rear pane moves to the position of FIG. 2e.

When both panes are in a covering or closed position and the both sunroof open switch position is selected, the rear panes and front and rear sunshades move simultaneously; the rear sunshade moves to the position of FIG. 3e and then front sunshade moves to the position also shown in FIG. 3e; the rear pane then moves to the position of FIG. 2g, after which, front pane slides to the retracted position also shown in FIG. 2g. When both sunroofs are covering and the rear sunroof vent switch position is selected, the rear sunshade moves to the position of FIG. 3b and rear pane moves to the position shown in FIG. 2h. When both panes are closed or covering and the sunroof-both vent switch position is selected, rear sunshade and front sunshade simultaneously move to the positions in FIG. 3e while front and rear panes simultaneously move to the position shown in FIG. 2f. The closing operations are in reverse order of the opening operations discussed above.

With the addition of a current sensing capability in the control system, both sunroof panes can be powered simultaneously to their retracted positions. The current sensing capability allows for the device to check for current rises that would indicate a potential collision or binding of the sunroof operating mechanism. With this current sensing capability, the ASC switching position would allow for coordinated and simultaneous sliding movement of both sunroof panes and both sunshades. A time dependency feature can also be added to the software to allow for express open or close features.

While the preferred embodiments of a sunroof assembly and control system therefore have been disclosed, it will be appreciated that various modifications may be made without departing from the present invention. For example, any control means, whether mechanical, electrical or software driven may be employed to operate the dual sunroof pane and dual sunshade system of the present invention. Furthermore, other software programs may be used in combination with the electrical circuit and switch disclosed above. Other electrical, mechanical or optical sensing means may be used with the control system. The novel control system, drain trough and sunshade guide rail constructions previously disclosed herein may be employed with dual or single sunroof systems. Moreover, both sunroof panes may be retracted to positions below the roof or above the roof. Also, many other manual or powered operating mechanisms and actuators can be used to slide, pivot or otherwise move each or all of the sunroof panes and sunshades. For example, solenoid, rack and pinion, and fluid pressure means may be employed to drive the panes and sunshades. The guide rail embodiments discussed heretofore may also be used to guide a pair of sunroof panes in addition to or instead of sunshades. Various materials have been disclosed in an exemplary fashion, however, a variety of other materials may of course be employed. It is intended by the following claims to cover these and any departures from the disclosed embodiments which fall within the true spirit of this invention.

The invention claimed is:

1. A sunroof assembly for an automotive vehicle having a stationary roof, said sunroof assembly comprising:

a front roof panel;

a rear roof panel, said roof panels being movable to retracted positions to allow a single uninterrupted sunroof opening area;

a front sunshade movable from a functional position, located below said front panel when said front panel is in a covering position, to a stowed position;

a rear sunshade movable from a functional position, located below said rear panel when said rear panel is in a covering position, to a stowed position;

said front and rear sunshades being slidably movable from said functional covering positions to said stowed positions, said rear sunshade being movable when said front sunshade is stationary and said front sunshade being movable when said rear sunshade is stationary, said front and rear sunshades being selectively located substantially below said stationary roof when in said stowed positions;

a first mechanism operable to move said front panel;

a second mechanism operable to move said rear panel;

a third mechanism operable to move said front sunshade; and a fourth mechanism operable to move said rear sunshade;

said rear panel and said rear sunshade selectively opening substantially simultaneously to fully retracted positions when said front panel is maintained in its covering position; and said front panel selectively opening to a partially retracted and venting position substantially simultaneously with said front sunshade moving to an intermediate position between fully retracted and fully functional covering positions, when said rear panel is maintained in said covering position.

2. The sunroof assembly of claim 1 at least one of said third and fourth mechanisms further comprising:

a first set of sunshade guide rails;

a first coupling connected to one of said sunshades for providing slidable engagement with said first set of sunshade guide rails; and a second coupling connected to one of said sunshades for providing slidable engagement with said first set of sunshade guide rails.

3. The sunroof assembly of claim 2 wherein said first set of sunshade guide rails includes:

a slot disposed in a median surface; and a ramp positioned adjacent to said slot for downwardly directing said second coupling;

said first coupling being larger than said second coupling whereby said first coupling is slidable along said median surface past said slot and said ramp.

4. The sunroof assembly of claim 2 further comprising:

a second set of sunshade guide rails; and said second coupling providing slidable engagement with said second set of sunshade guide rails.

5. The sunroof assembly of claim 1 wherein said front sunshade is stowable between said rear sunshade and said roof.

6. The sunroof assembly of claim 1 further comprising:

a first sunshade drive mechanism moving said front sunshade between said functional and stowed positions; and a second sunshade drive mechanism moving said rear sunshade between said functional and stowed positions.

7. The sunroof assembly of claim 6 further comprising a control system including:

front panel control means for selectively supplying electrical current to a first mechanism;

rear panel control means for selectively supplying electrical current to a second mechanism;

front sunshade control means for selectively supplying electrical current to a third mechanism;

rear sunshade control means for selectively supplying electrical current to a fourth mechanism.

8. The sunroof assembly of claim 7 wherein said control system further includes control means for selectively energizing said drive mechanisms independently from each other.

9. The sunroof assembly of claim 7 wherein said control system further includes control means for selectively energizing at least pairs of said drive mechanisms in coordination with each other.

10. The sunroof assembly of claim 7 further comprising:

an electric switch assembly selectively positionable to govern the operation of said control system.

11. The sunroof assembly of claim 1 wherein said rear panel is disposed below said stationary roof when in a retracted position.

12. The sunroof assembly of claim 1 wherein said front panel is pivotable from a covering position, defined as being substantially flush with said stationary roof, to a vent position defined as having a rear edge of said front panel tilted above a plane of said stationary roof.

13. The sunroof assembly of claim 12 wherein said rear panel is pivotable from a covering position, defined as being substantially flush with said stationary roof, to a vent position defined as having a rear edge of said rear panel tilted above a plane of said stationary roof.

14. The sunroof assembly of claim 13 further comprising a control system including vent position control means for selectively supplying electrical current to venting drive means for tilting said panels to said vent positions.

15. The sunroof assembly of claim 1 wherein said front panel is disposed substantially above said stationary roof when in a retracted position.

16. The sunroof assembly of claim 1 wherein said front panel is disposed substantially above said rear panel when said front panel is in a retracted position.

17. The sunroof assembly of claim 1 further comprising a drain trough movably affixed to at least one of said panels.

18. The sunroof assembly of claim 1 further comprising a control system including:

a microprocessor and a front sunshade electric motor circuit selectively energizing said third mechanism; and a rear sunshade electric motor circuit and said microprocessor selectively energizing said fourth mechanism.

19. The sunroof assembly of claim 18 wherein said control system further includes:

control means for selectively energizing said front and rear drive means independently from each other.

20. The sunroof assembly of claim 18 wherein said control system further includes control means for selectively energizing said front and rear drive mechanisms synchronously with each other, and said drive mechanisms including a front sunshade electric motor and a rear sunshade electric motor.

21. The sunroof assembly of claim 1 further comprising for each sunshade:

a sunshade cable coupled to a respective one of said sunshades;

a magnetic device affixed to said cable; and a fractional horsepower motor drivably coupled to said sunshade cable.

22. The sunroof assembly of claim 21 further comprising:

an electrical control system controlling the position of said sunshades to an infinite number of slide positions; and between said fully functional covering and stowed positions; and a set of switches that input a signal to said control system in response to locations of said magnetic devices relative to at least one of said switches.

23. The sunroof assembly of claim 1 further comprising:

a set of guide rails slidably supporting said front and rear sunshades.

24. The sunroof assembly of claim 1 further comprising:
a first set of guide rails slidably supporting said front sunshade; and
a second set of guide rails slidably supporting said rear sunshade.

25. A sunroof assembly for an automotive vehicle having a roof, said sunroof assembly comprising:
a set of guide rails having a main branch dividing into an upper branch and a lower branch, said branches intersecting at an access slot, a ramp leading from said access slot to said lower branch; and
a first sunshade slidably engaging within said guide rails, said first sunshade having a first coupling connecting at least a portion of said first sunshade to said set of guide rails, said first coupling having a larger size than said access slot such that said first coupling passes over said access slot between said main branch and said upper branch of said sets of guide rails, said coupling being pivotable in relation to said first sunshade.

26. The sunroof assembly of claim 25 further comprising:
first drive means for selectively sliding said first sunshade along said first set of guide rails; and
second drive means for selectively sliding said second sunshade.

27. The sunroof assembly of claim 26 wherein each of said drive means include:
a fractional horsepower electric motor; and
a cable drivably coupling said motor and said sunshade.

28. The sunroof assembly of claim 25 further comprising:
a second sunshade having a second coupling slidably connecting said second sunshade to said set of guide rails, said second coupling having a size thereof relatively smaller than said access slot thereby allowing said coupling to ride down said ramp and along said lower branch of said set of guide rails.

29. A sunroof assembly for an automotive vehicle having a roof, said sunroof assembly comprising:
a set of guide rails having a main branch dividing into an upper branch and a lower branch, said branches intersecting at an access slot, a ramp leading from said access slot to said lower branch;
a first sunshade slidably engaging within said guide rails, said first sunshade having a first coupling connecting at least a portion of said first sunshade to said set of guide rails, said first coupling having a larger size than said access slot such that said first coupling passes over said access slot between said main branch and said upper branch of said sets of guide rails; and
a second coupling slidably connecting a second portion of said first sunshade to said set of guide rails, said second coupling having a size relatively smaller than said access slot thereby allowing said coupling to ride down said ramp and along said lower branch of said set of guide rails;
at least one of said couplings being pivotable in relation to said first sunshade.

30. The sunroof assembly of claim 29 further comprising:
a second set of guide rails; and
a second sunshade slidably engaged with said second set of guide rails.

31. A sunroof assembly for an automotive vehicle, said sunroof assembly comprising:
a movable front roof panel;
a movable rear roof panel;
a front sunshade movable from a functional position to a stowed position, said functional position of said front sunshade being located below said front panel when said front panel is in a covering position;
a rear sunshade movable from a functional position to a stowed position, said functional position of said rear sunshade being located below said rear panel when said rear panel is in a covering position;
a first mechanism operable to move said front panel;
a second mechanism operable to move said rear panel;
a third mechanism operable to move said front sunshade;
a fourth mechanism operable to move said rear sunshade;
a guide rail having a main branch dividing into an upper branch and a lower branch, said upper and lower branches intersecting at an access slot, a ramp leading from said access slot to said lower branch; and
a first coupling connecting one of said sunshades to said guide rail, said first coupling having a larger size than said access slot such that said first coupling passes over said access slot between said main branch and said upper branch of said guide rail, said coupling being pivotable in relation to said one sunshade.

32. The sunroof assembly of claim 31 further comprising a second coupling connecting one of said sunshades to said guide rail, said second coupling having a size smaller than said access slot such that said second coupling is operable to pass through said access slot and along said lower branch.

33. The sunroof assembly of claim 31 wherein said panels are slidable between covering positions and retracted positions.

34. The sunroof assembly of claim 33 wherein said panels are pivotable between substantially flush roof positions and tilted vent positions.

35. The sunroof assembly of claim 31 further comprising:
a first electric motor operably moving said front sunshade; and
a second electric motor operably moving said rear sunshade.

* * * * *

UNITED STATES PATENT AND TRADEMARK OFFICE
CERTIFICATE OF CORRECTION

PATENT NO. : 5,951,100
DATED : September 14, 1999
INVENTOR(S) : Kip A. Ewing et al It is certified that error appears in the above-identified patent and that said Letters Patent is hereby corrected as shown below:

Column 9, in the Table, line 2, "input" should be -- output --.

Column 9, in the Table, line 22, "RRcIFFCI" should be -- RRcIFFcl --.

Column 9, in the Table, line 55, "Swopen,swoff" should be -- SWopen, swoff --.

Column 11, in the Table, line 48, "199950" should be -- 99950 --.

Column 11, in the Table, line 49, insert ";" at the margin.

Column 11, in the Table, line 63, "loop" should be -- ;loop --.

Column 13, in the Table, line 4, "FlgassC" should be -- FglassC --.

Column 13, in the Table, lines, 7,8, "clrb" should be -- FshadeC --.

Column 13, in the Table, line 20, "switchpos,#000" should be -- switchpos,#0000 --.

Column 13, in the Table, delete lines 30, 31, 32 in their entirety.

Column 13, in the Table, line 49, "scanSWHpos" should be -- ScanSHpos --.

Column 13, in the Table, line 57, "RhadeO" should be -- RshadeO --.

Column 15, in the Table, line 7, "bothshad" should be -- :Crear --.

UNITED STATES PATENT AND TRADEMARK OFFICE
CERTIFICATE OF CORRECTION

PATENT NO. : 5,951,100
DATED : September 14, 1999
INVENTOR(S) : Kip A. Ewing et al It is certified that error appears in the above-identified patent and that said Letters Patent is hereby corrected as shown below:

Column 15, in the Table, between lines 7 and 8, insert

```
-- :endCR    clrb    RshadeO --.
--           clrb    RshadeC --.
--           jmp     bothshad --.
```

Column 15, in the Table, between lines 56 and 57, insert

```
-- :endFv    clrb    FglassO --.
--           mov     timer,Aport --.
--           AND     timer,#00000110b --.
--           cje     timer,#00000000b,endAll --.
--           jmp     :vent --.
```

Column 17, in the Table, line 50, "; the" should be -- ;the --.

UNITED STATES PATENT AND TRADEMARK OFFICE
CERTIFICATE OF CORRECTION

PATENT NO. : 5,951,100
DATED : September 14, 1999
INVENTOR(S) : Kip A. Ewing et al It is certified that error appears in the above-identified patent and that said Letters Patent is hereby corrected as shown below:

Column 17, in the Table, line 61, "Rglass O" should be -- RglassO --.

Column 19, in the Table, line 9, ":;" should be -- ;; --.

Column 23, line 29, delete ":".

Column 23, line 30, no new paragraph starting "a second sunshade. . .".

Column 23, line 32, delete "thereof".

Signed and Sealed this

Twenty-seventh Day of March, 2001

Attest:

NICHOLAS P. GODICI

Attesting Officer

Acting Director of the United States Patent and Trademark Office